(12) United States Patent
Misra et al.

(10) Patent No.: US 10,169,330 B2
(45) Date of Patent: Jan. 1, 2019

(54) ANTICIPATORY SAMPLE ANALYSIS FOR APPLICATION MANAGEMENT

(71) Applicant: Accenture Global Solutions Limited, Dublin (IE)

(72) Inventors: Janardan Misra, Bangalore (IN); Divya Rawat, Dehradun (IN); Milind Savagaonkar, Bangalore (IN); Sanjay Podder, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 30 days.

(21) Appl. No.: 15/370,810

(22) Filed: Dec. 6, 2016

(65) Prior Publication Data

US 2018/0121417 A1 May 3, 2018

(30) Foreign Application Priority Data

Oct. 31, 2016 (IN) .............................. 201641037220

(51) Int. Cl.
*G06F 17/27* (2006.01)
*G06N 99/00* (2010.01)
*G06F 11/07* (2006.01)

(52) U.S. Cl.
CPC ...... *G06F 17/2785* (2013.01); *G06F 11/0766* (2013.01); *G06F 17/271* (2013.01); *G06F 17/274* (2013.01); *G06N 99/005* (2013.01)

(58) Field of Classification Search
CPC ... G06F 17/2785; G06F 17/274; G06F 17/271
USPC .......................................................... 704/9
See application file for complete search history.

(56) References Cited

U.S. PATENT DOCUMENTS 6,338,062 B1 * 1/2002 Liu .................. G06F 17/30707
2008/0256063 A1 * 10/2008 Nasukawa ........ G06F 17/30985
2010/0138216 A1 * 6/2010 Tanev ................ G06F 17/2765
704/9

(Continued)

OTHER PUBLICATIONS

Baker et al, "Distributional Clustering of Words for Text Classification," Proceedings of the 21st Annual International ACM SIGIR Conference on Research and Development in Information Retrieval, 1998, pp. 96-103.*

(Continued)

*Primary Examiner* — Paras D Shah
*Assistant Examiner* — Oluwadamilola M Ogunbiyi
(74) *Attorney, Agent, or Firm* — Harrity & Harrity, LLP

(57) ABSTRACT

A device may receive a set of first samples of textual content. A device may identify a set of clusters of first samples of the set of first samples. A device may identify a pattern of occurrence based on the set of clusters. The pattern of occurrence to identify two or more clusters, of the set of clusters, based on an order in which first samples associated with the two or more clusters were generated or received. A device may receive one or more second samples of textual content. A device may determine that the one or more second samples are semantically similar to one or more corresponding clusters associated with the pattern of occurrence. A device may identify a predicted sample based on the pattern of occurrence and the one or more corresponding clusters. A device may perform an action based on identifying the predicted sample.

20 Claims, 8 Drawing Sheets

(56) References Cited

U.S. PATENT DOCUMENTS

| | | | | |
|---|---|---|---|---|
| 2011/0016375 A1* | 1/2011 | Ramic | .................. | G06F 17/241 |
| | | | | 715/205 |
| 2012/0259855 A1* | 10/2012 | Mizuguchi | .......... | G06F 17/3071 |
| | | | | 707/739 |
| 2014/0067370 A1* | 3/2014 | Brun | ..................... | G06F 17/271 |
| | | | | 704/9 |
| 2015/0066939 A1* | 3/2015 | Misra | .................. | G06F 17/3071 |
| | | | | 707/739 |
| 2016/0019460 A1* | 1/2016 | Li | .......................... | G06F 9/542 |
| | | | | 719/318 |
| 2016/0364468 A1* | 12/2016 | Huang | .............. | G06F 17/30598 |
| 2017/0293625 A1* | 10/2017 | Nachlieli | ............ | G06F 17/3071 |

OTHER PUBLICATIONS

Bollegala et al, "Measuring Semantic Similarity Between Words Using Web Search Engines," The University of Tokyo, www 7, 2007, pp. 757-766.*

Misra et al, "Software Clustering: Unifying Syntactic and Semantic Features," 19th Working Conference on Reverse Engineering, 2012, pp. 113-122.*

* cited by examiner

| Incident Sequence from Recent Data | Next Anticipated Incident | Expected Priority Level | Confidence of Anticipation | Potential Duplicates | Recommended Assignee/ Resolutions | Matching Patterns |
|---|---|---|---|---|---|---|
| I00I01, I02 _150_ | Travel Website is down _152_ | High _156_ | High _158_ | INC104<br>INC108 _160_ | From other Sources | _154_ [P1.C1.C0] |
| I03 | JMDBR (Channel B1): Critical | Medium | High | INC101<br>INC102<br>INC103<br>INC106<br>INC107 | From other Sources | [P1.C1] |

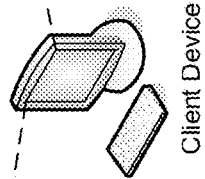

Client Device

FIG. 1D

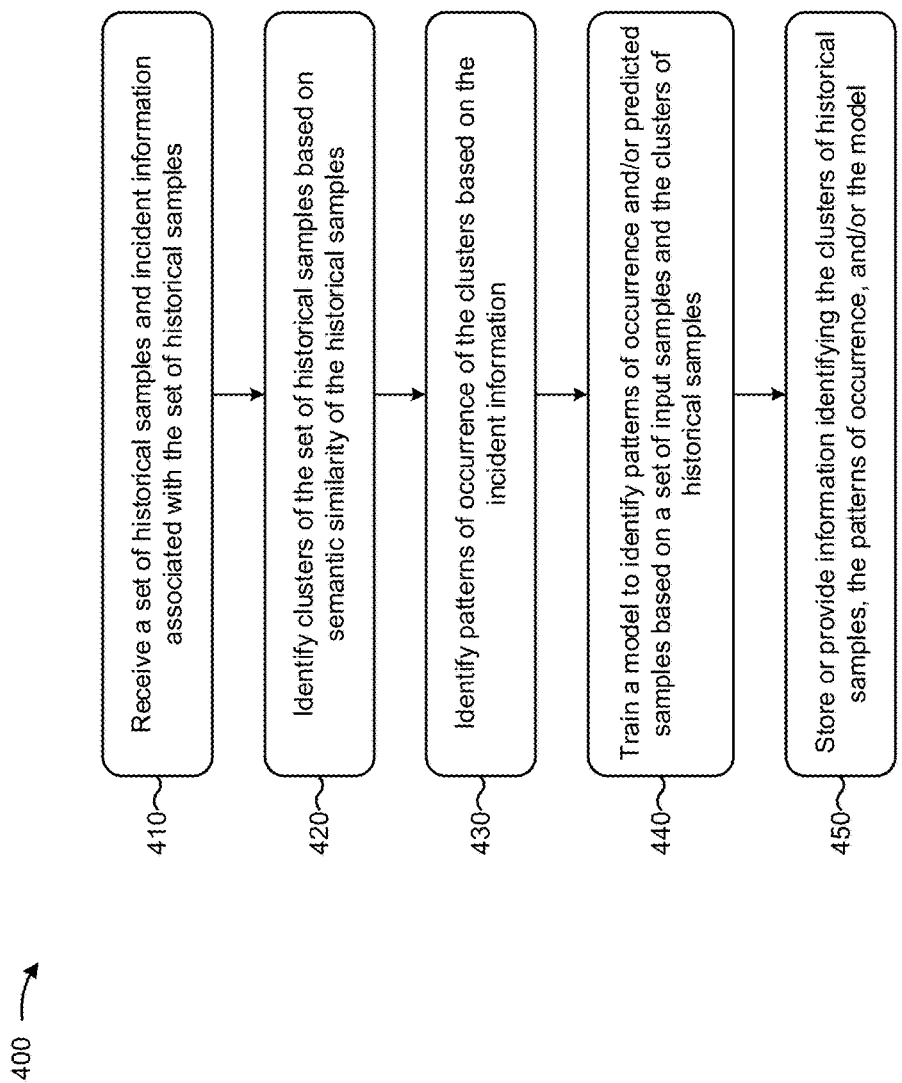

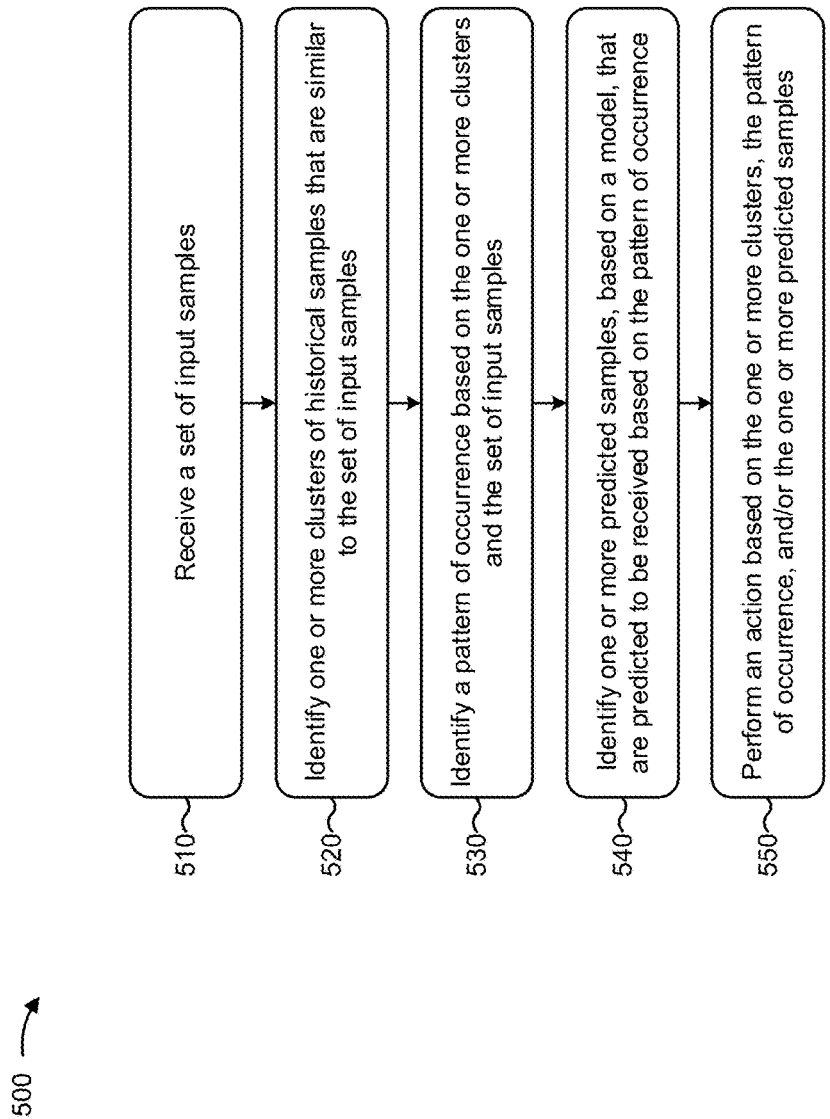

ANTICIPATORY SAMPLE ANALYSIS FOR APPLICATION MANAGEMENT

RELATED APPLICATION

This application claims priority under 3 U.S.C. § 119 to Indian Patent Application No. 201641037220, filed on Oct. 31, 2016, the content of which is incorporated by reference herein in its entirety.

BACKGROUND

A sample of text may include or be associated with various attributes that can be used to classify or process the sample, such as a syntax of the sample, particular words included in the sample, a length of the sample, or the like. A device may identify the various attributes based on a process such as natural language processing, and may process the sample based on the various attributes.

SUMMARY

According to some possible implementations, a device may include one or more processors. The one or more processors may receive a set of first samples of textual content. The one or more processors may identify a set of clusters of first samples of the set of first samples. A cluster, of the set of clusters, to be identified based on semantic similarity of the first samples included in the cluster. The one or more processors may identify a pattern of occurrence based on the set of clusters. The pattern of occurrence to identify two or more clusters, of the set of clusters, based on an order in which first samples associated with the two or more clusters were generated or received. The one or more processors may receive one or more second samples of textual content. The one or more processors may determine that the one or more second samples are semantically similar to one or more corresponding clusters associated with the pattern of occurrence. The one or more processors may identify a predicted sample based on the pattern of occurrence and the one or more corresponding clusters. The one or more processors may perform an action based on identifying the predicted sample.

According to some possible implementations, a method may include receiving, by a device, a set of first samples of textual content. The method may include identifying, by the device, a set of clusters of first samples of the set of first samples. Each cluster, of the set of clusters, to be identified based on semantic similarity of first samples included in each cluster. The method may include identifying, by the device, a pattern of occurrence based on the set of clusters. The pattern of occurrence to identify two or more clusters, of the set of clusters, based on an order in which first samples associated with the two or more clusters were generated or received. The method may include receiving, by the device, one or more second samples of textual content. The method may include determining, by the device, that the one or more second samples are semantically similar to one or more corresponding clusters associated with the pattern of occurrence. The method may include identifying, by the device and based on the pattern of occurrence and the one or more corresponding clusters, a predicted sample. The method may include performing, by the device, an action based on identifying the predicted sample.

According to some possible implementations, non-transitory computer-readable medium may store one or more instructions that, when executed by one or more processors, may cause the one or more processors to receive a set of first samples of textual content. The one or more instructions, when executed by one or more processors, may cause the one or more processors to identify a set of clusters of first samples of the set of first samples. Each cluster, of the set of clusters, to be identified based on semantic similarity of first samples included in each cluster. The one or more instructions, when executed by one or more processors, may cause the one or more processors to identify a set of patterns of occurrence based on the set of clusters. Each pattern of occurrence to identify two or more respective clusters, of the set of clusters, based on an order in which first samples associated with the two or more respective clusters were generated or received. The one or more instructions, when executed by one or more processors, may cause the one or more processors to receive one or more second samples of textual content. The one or more instructions, when executed by one or more processors, may cause the one or more processors to determine that the one or more second samples are semantically similar to one or more corresponding clusters of a particular pattern of occurrence of the set of patterns of occurrence. The one or more instructions, when executed by one or more processors, may cause the one or more processors to identify, based on the particular pattern of occurrence and the one or more corresponding clusters, one or more predicted samples. The one or more instructions, when executed by one or more processors, may cause the one or more processors to perform an action based on identifying the one or more predicted samples.

BRIEF DESCRIPTION OF THE DRAWINGS

FIGS. 1A-1D are diagrams of an overview of an example implementation described herein;

FIG. 4 is a flow chart of an example process for training a model to identify patterns of occurrence and/or predicted samples for a set of input samples based on a set of historical samples; and FIG. 5 is a flow chart of an example process for identifying patterns of occurrence and/or predicted samples for a set of input samples based on a model.

DETAILED DESCRIPTION

Figure 1A:
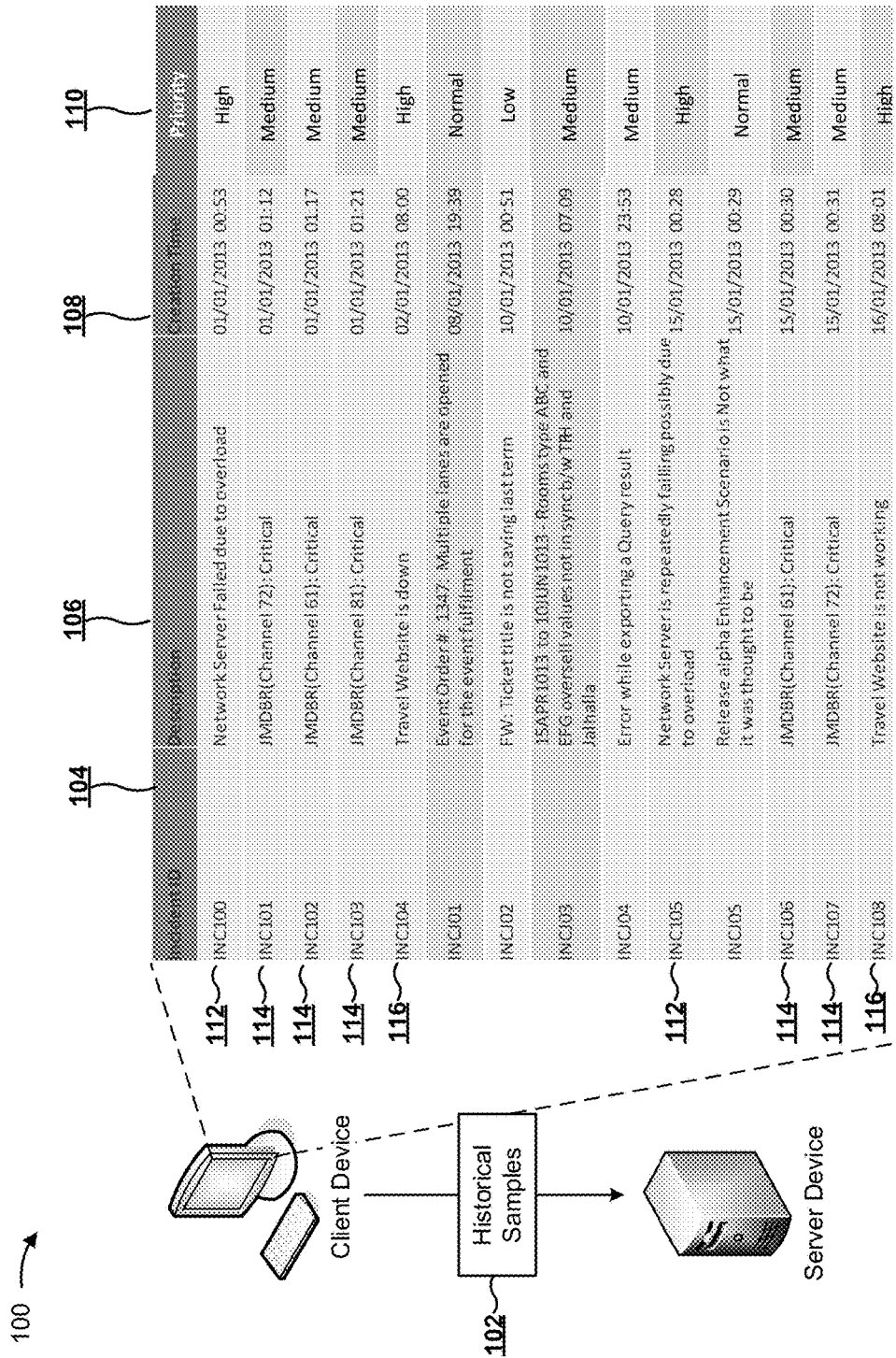

The following detailed description of example implementations refers to the accompanying drawings. The same reference numbers in different drawings may identify the same or similar elements.

An entity (e.g., an information technology (IT) firm, a software designer, etc.) may implement a system, such as an application (e.g., a software application), to be used or accessed by end users. An end user may encounter an error, a flaw, an incident, or the like, related to the system. The entity may provide an incident reporting system so that the end user can notify the entity of the incident (e.g., based on a service ticket or textual sample provided via the incident reporting system), and so that the entity can assign a worker to investigate and/or resolve the incident.

In investigating the incident, it may be helpful to identify historical service tickets samples (e.g., historical service tickets) related to the incident. This is because the historical samples may be associated with information identifying a cause of the incident, other samples or service tickets related to the incident, or the like. Therefore, an entity (e.g., an administrator, a human, etc.) may attempt to identify historical samples, corresponding to related events, for use in addressing the current incident. However, a human may perform this analysis inefficiently, and may use subjective, slow processes to identify the historical samples.

Additionally, it may be helpful to identify predicted samples or incidents based on an input sample and a set of historical samples relating to the input sample. However, historical samples may be recorded using natural language, so variations may exist between samples that are, in fact, related to each other (e.g., based on a common underlying event). A user may attempt to identify historical samples that are related to each other, based on an order of occurrence of the historical samples, to identify predicted samples subjectively (e.g., based on experience, expertise, and systemic knowledge). However, the user's attempts may be inaccurate, inconsistent, and time-consuming. This may also lead to occurrence of events or incidents that could have been prevented based on successful prediction of the predicted samples.

Implementations described herein may receive historical samples (i.e., historical service tickets or incident data) and extract patterns identifying clusters of historical samples that may be associated with a particular underlying event or incident. Further, implementations described herein may match input samples (e.g., newly received service tickets) with the clusters of historical samples. This may permit identification of predicted samples based on the clusters and the input samples, and may also permit determination of information associated with predicted samples, such as time of arrival, priority level, and/or level of confidence of occurrence of the predicted samples.

In this way, prediction of predicted samples may enable immediate closure of service tickets associated with the predicted samples (when the predicted incidents are duplicates, or when an underlying event associated with the input samples and the predicted samples has already been resolved), and/or may enable preventative measures to be taken with regard to the incidents (e.g., automatically), thereby conserving computational resources that would otherwise be used to process or address predicted samples independently of the input samples. Further, an objective computational process may be created to automate a previously subjective human-based determination (e.g., identification of predicted samples in light of historical incident information), which saves time, improves efficiency and accuracy of the determination, and is more easily scalable to large quantities of samples. Still further, identification of underlying system dynamics is enabled (e.g., identification of events causing service tickets, relationships between events causing service tickets, etc.), which allows for reconfiguration of the system to improve performance, conserve processor resources, and reduce system downtime.

FIGS. 1A-1D are diagrams of an overview of an example implementation 100 described herein. As shown in FIG. 1A, example implementation 100 may include a client device and an incident processing system. It is noted that, for the purpose of FIGS. 1A-1D, "sample" may be used interchangeably with "incident" or "service ticket."

As shown by reference number 102, the client device may identify historical samples to the incident processing system. The historical samples may be associated with incident information relating to the historical samples. For example, as shown by reference number 104, each historical sample may be associated with an incident identifier (e.g., a string of one or more characters). As shown by reference number 106, each historical sample may also be associated with a description (e.g., a textual description of abnormal behavior of an application). As shown by reference number 108, each historical sample may also be associated with a timestamp (e.g., a time at which each historical sample was received or generated). As shown by reference number 110, each historical sample may also be associated with a priority level identifying a priority for processing or resolving the incident associated with the historical sample.

Clusters of the historical samples may be identified (e.g., by the incident processing system), where each cluster is a plurality of samples that are semantically similar to each other and/or that occur or are received within a particular time period. As shown by reference number 112, a first cluster of samples may be identified to include incidents INC100 and INC105 based on a similarity of descriptions and priority levels of incidents INC100 and INC105. The semantic similarity of the first cluster indicates that the first cluster may be associated with a particular underlying event.

As shown by reference number 114, a second cluster of samples may be identified that are semantically similar to each other (e.g., incidents INC101, INC102, INC103, INC106, and INC107) based on a similarity of descriptions and priority levels of the incidents. As with the first cluster, the semantic similarity of the second cluster indicates that the second cluster may be associated with a particular underlying event. In some cases, the underlying event associated with the second cluster may be related to the event associated with the first cluster, may be caused by the event associated with the first cluster, or may be the same event associated with the first cluster.

As shown by reference number 116, a third cluster of samples may be identified that are semantically similar to each other (e.g., incidents INC104 and INC108) based on a similarity of descriptions and priority levels of the incidents. In some implementations, the clusters of samples may be identified based on times associated with the clusters of samples. For example, when two or more samples occur within a particular time period, and when the two or more samples are semantically similar, the two or more samples may be included in a same cluster.

Figure 1B:
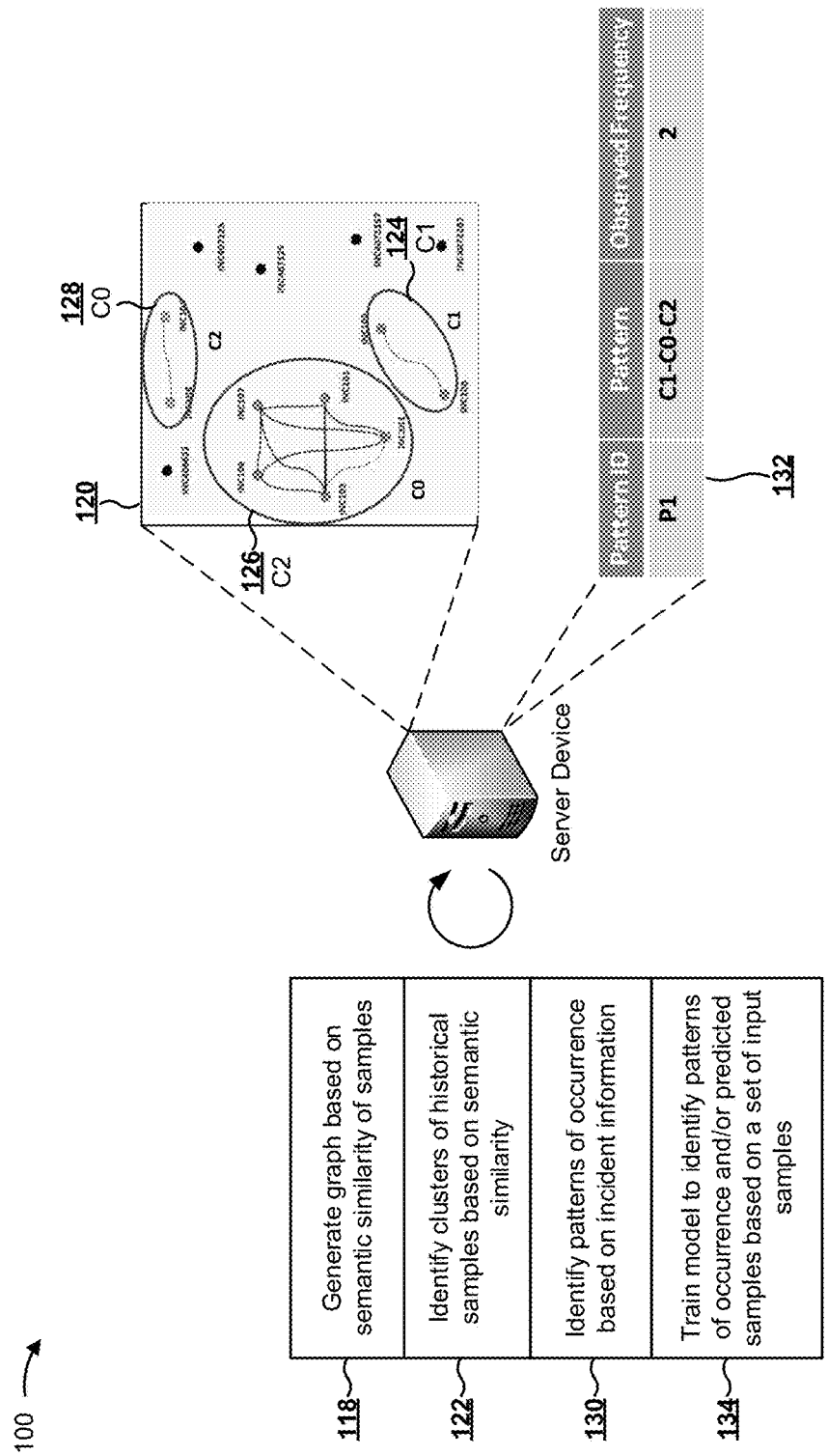

As shown in FIG. 1B, and as shown by reference number 118, the incident processing system may generate a graph (e.g., a graph data structure) which may identify historical samples (e.g., using nodes of the graph) and semantic relationships between the historical samples (e.g., using links between the nodes). For example, as shown by reference number 120, the graph may identify the historical samples based on the incident identifiers associated with the historical samples.

As shown by reference number 122, the incident processing system may identify, based on semantic similarity, clusters of samples that correspond to the historical samples shown in FIG. 1A. For example, as shown by reference number 124, the incident processing system may identify a cluster denoted as C1, which corresponds to the first cluster 112, based on the incident identifiers INC100 and INC105. Similarly, as shown by reference number 126, the incident processing system may identify a cluster denoted as C2, which corresponds to the second cluster 114, based on the incident identifiers INC101, INC102, INC103, INC106, and INC107. Similarly, as shown by reference number 128, the incident processing system may identify a cluster denoted as C0, which corresponds to the third cluster 116, based on the incident identifiers INC104 and INC108.

As shown by reference number 130, the incident processing system may identify patterns of occurrence based on incident information. A pattern of occurrence identifies an observed sequence of events, and identifies a respective cluster associated with each event of the sequence of events. For example, the incident processing system may identify patterns of occurrence based on times associated with the clusters, or based on other incident information, such as priority levels of the historical samples, or repeated co-occurrence of particular clusters in particular time periods.

As shown by reference number 132, an example pattern of occurrence may be identified by a pattern identifier of P1. In this case, one or more samples associated with clusters C0, C1, and C2 are observed occurring in the order C1-C0-C2, and the observed frequency of 2 indicates that this sequence has been observed twice in the set of historical samples. For example, referring to FIG. 1A, INC100 of cluster C1 preceded INC101, INC102, and INC103 of cluster C0. Further, INC101, INC102, and INC103 of cluster C0 preceded INC104 of cluster C2. This pattern is repeated with regard to INC105 (cluster C1), INC106 and INC107 (cluster C0), and INC108 (cluster C2).

As shown by reference number 134, the incident processing system may train a predictive model to identify patterns of occurrence and/or predicted samples based on a set of input samples. In this case, the set of input samples may include one or more samples for which to identify patterns of occurrence and/or predicted samples. The patterns of occurrence may permit identification of predicted samples, as described in connection with FIGS. 1C and 1D. For example, when a set of input samples includes a sample that matches (e.g., is semantically similar to) cluster C1 followed by a sample that matches (e.g., is semantically similar to) cluster C0, the predictive model may identify a sample of cluster C2 as a predicted sample. The predictive model may be trained based on a machine learning algorithm, an artificial intelligence approach, a big data technique, or the like.

Figure 1C:
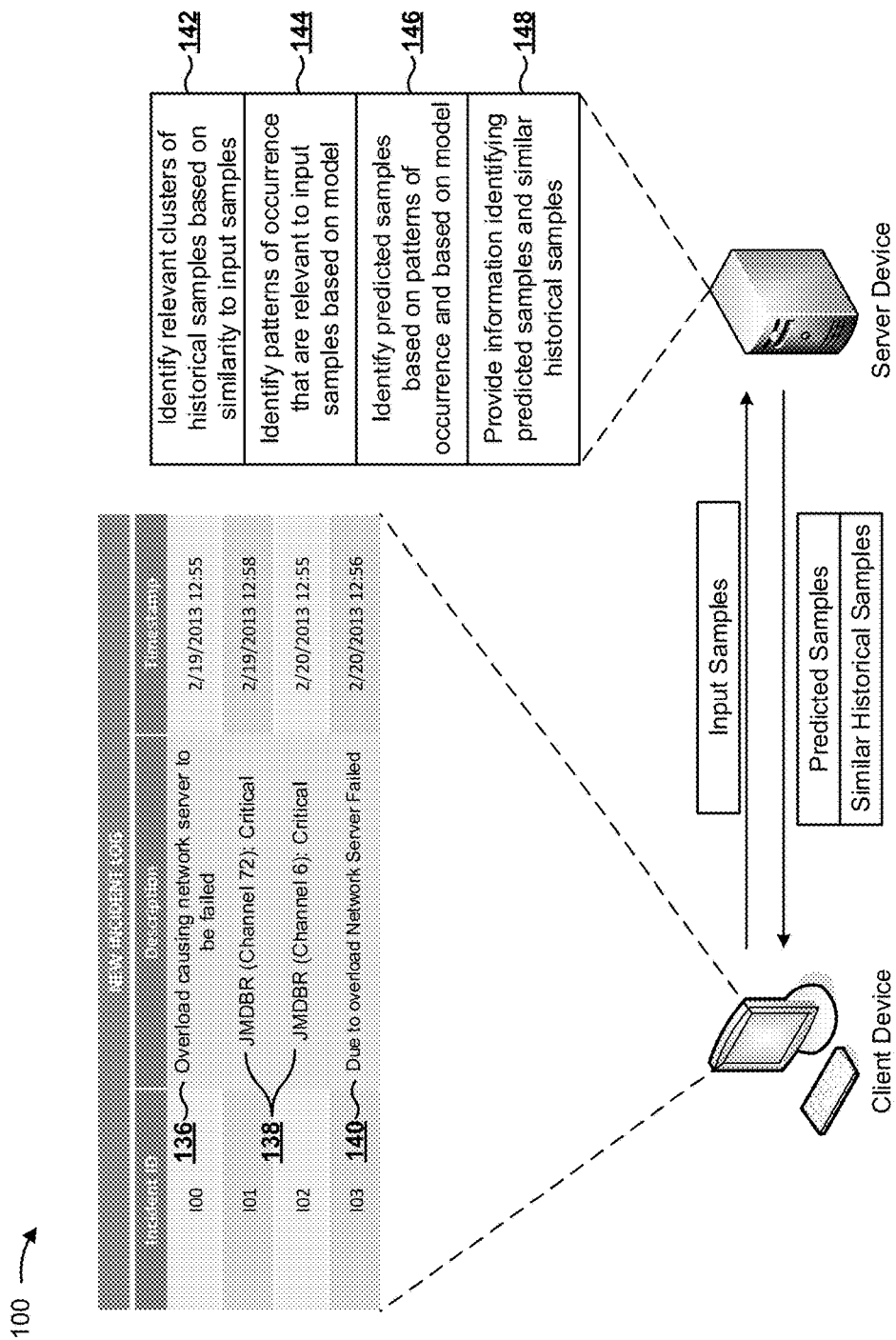

As shown in FIG. 1C, the client device may provide a set of input samples (shown as "new incident log") to the incident processing system for identification of patterns of occurrence and/or predicted samples associated with the set of input samples. As shown in the new incident log, each input sample is associated with an incident identifier, a textual description, and a timestamp.

As shown by reference number 136, incident I00 is associated with a textual description similar to incidents INC100 and INC105 of cluster C1 (e.g., as was shown by reference number 112 in FIG. 1A and reference number 124 in FIG. 1B). As shown by reference number 138, incidents I01 and I02 are associated with textual descriptions similar to incidents INC101, INC102, INC103, INC106, and INC107 of cluster C0 (e.g., as was shown by reference number 114 in FIG. 1A and reference number 126 in FIG. 1B). As shown by reference number 140, incident I03 is associated with textual descriptions similar to incidents INC100 and INC105 of cluster C1 (e.g., as was shown by reference number 112 in FIG. 1A and reference number 124 in FIG. 1B).

As shown by reference number 142, the incident processing system may identify relevant clusters based on semantic similarity of historical samples, of the clusters, to the input samples. For example, the incident processing system may identify the clusters based on the model. In this case, the model may receive input samples, and may determine information identifying relevant clusters that are similar to the input samples.

As shown by reference number 144, the incident processing system may identify patterns of occurrence that are relevant to the input samples based on the predictive model. For example, the predictive model may receive input samples, and may receive or determine information identifying clusters of historical samples that are semantically similar to the input samples. The predictive model may output information identifying patterns that are relevant to the input samples. In this case, the pattern may be the pattern identified by reference number 132 of FIG. 1B.

As shown by reference number 146, the incident processing system may identify predicted samples based on the patterns and based on the predictive model. For example, the incident processing system may identify one or more samples (included in clusters of the pattern) that have not yet been received. The one or more samples identified may be identified as predicted samples. In this case, the incident processing system may identify predicted samples associated with clusters C0 and C2 based on the input samples associated with C0 and C1 and the pattern C1-C0-C2 identified in the historical samples. For example, the incident processing system may identify a first predicted sample of C2 associated with the sequence of incidents including I00, I01, and I02, and may identify a second predicted sample of C0 associated with the incident I03.

As shown by reference number 148, the incident processing system may provide information identifying the predicted samples and similar historical samples that are similar to the predicted samples (e.g., similar historical samples identified by the clusters). For example, the incident processing system may provide the information as a report, to a client device, as shown in FIG. 1D. In some cases, the incident processing system may perform an action based on the information. For example, the incident processing system may automatically dispatch a worker based on a predicted sample. Additionally, or alternatively, the incident processing system may automatically assign a worker based on the worker having previously been assigned to one or more similar historical samples. Additionally, or alternatively, the incident processing system may automatically activate, deactivate, or reconfigure a device based on the predicted samples. Additionally, or alternatively, the incident processing system may order a part for a device associated with the one or more predicted samples. Additionally, or alternatively, the incident processing system may generate a work order based on the predicted samples. Additionally, or alternatively, the incident processing system may reboot a device associated with an incident relating to the one or more predicted samples. Additionally, or alternatively, the incident processing system may perform troubleshooting on a device based on the one or more predicted samples.

As shown in FIG. 1D, an example report may be generated based on the historical samples, the set of input samples, and/or an output of the predictive model. As shown by reference number 150, the report may identify a first incident sequence from the set of input samples (e.g., input samples I00, I01, and I02, corresponding to clusters C0 and C1, in the order C1-C0). As explained above, the incident processing system may identify cluster C2 based on the first incident sequence C1-C0 and the pattern C1-C0-C2. As shown by reference number 152, the report may identify an incident associated with cluster C2 as a predicted sample associated with the first incident sequence. For example, the report may identify a predicted sample with a textual description similar to "Travel Website is down."

As shown by reference number 154, the report may identify clusters that are associated with samples of the first incident sequence (e.g., cluster C1, which is semantically similar to incident I00, and cluster C0, which is semantically similar to incidents I01 and I02). As shown by reference number 160, the report may include identifiers corresponding to historical samples that are semantically similar to the predicted sample (e.g., historical samples of cluster C2), such as INC104 and INC108. As shown by reference number 156, the report may identify an expected priority level associated with the predicted sample (e.g., "High," based on a priority level associated with incident INC104 and INC108). As shown by reference number 158, the report may identify a confidence level associated with the predicted sample. The confidence level may be determined based on an output of the predictive model and/or based on a probability of occurrence of the predicted sample.

In this way, prediction of incidents may enable immediate closure of the predicted incidents (when the predicted incidents are duplicates) or may enable preventative measures to be taken with regard to the incidents (e.g., automatically), thereby conserving computational resources that would otherwise be used to process or address predicted incidents independently of the input service ticket.

Further, an objective computational process may be created to automate a previously subjective human-based determination (e.g., identification of predicted incidents in light of historical incident information), which saves time, improves efficiency and accuracy of the determination, and is more easily scalable to large quantities of service tickets.

Still further, identification of underlying system dynamics is enabled (e.g., identification of events causing service tickets, relationships between events causing service tickets, etc.), which allows for reconfiguration of the system to improve performance, conserve processor resources, and reduce system downtime.

As indicated above, FIGS. 1A-1D are provided merely as an example. Other examples are possible and may differ from what was described with regard to FIGS. 1A-1D.

Figure 2:
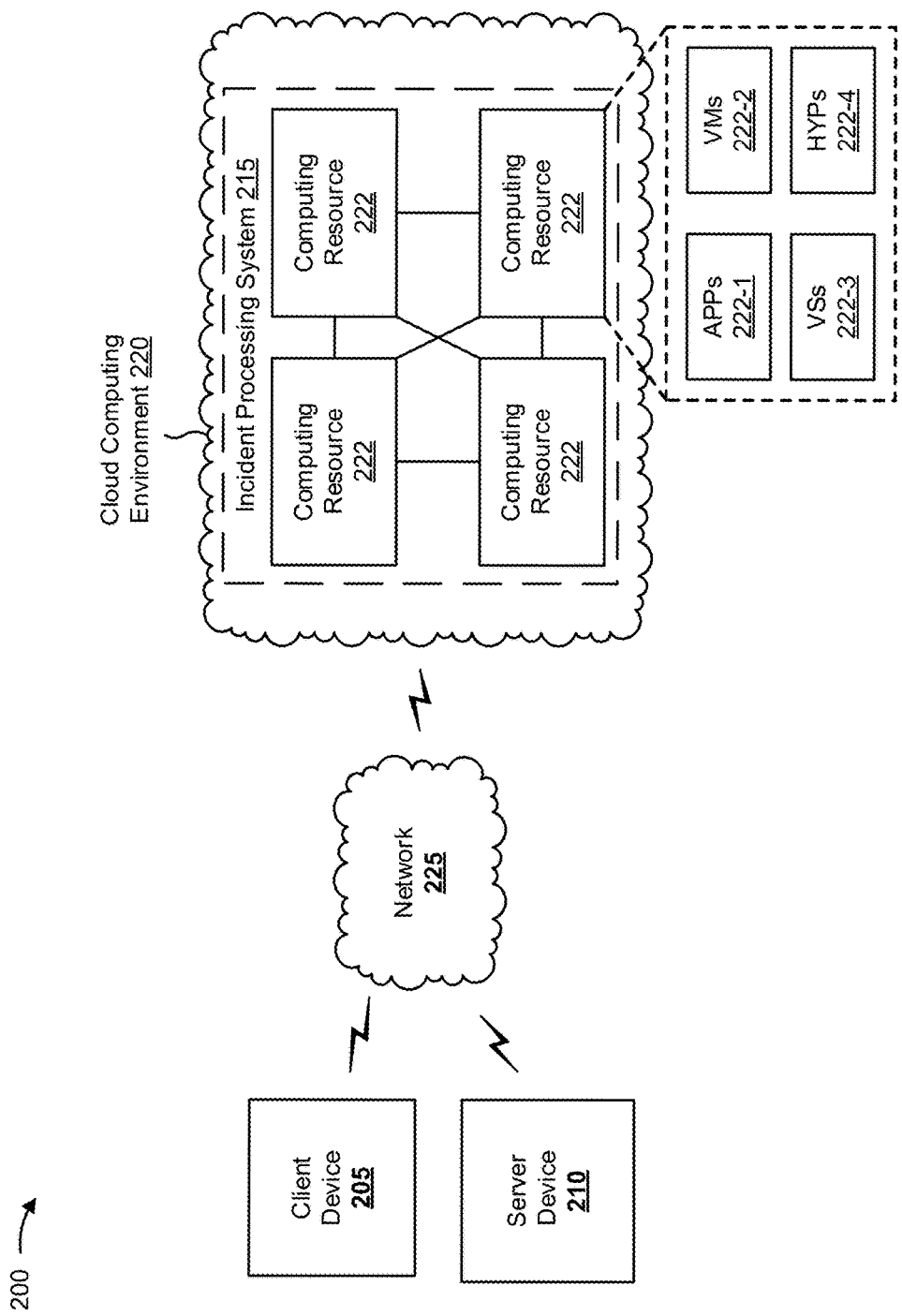
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a server device 210, an incident processing system 215 implemented in a cloud computing environment 220 of computing resources 222, and a network 225. Devices of environment 200 may interconnect via wired connections, wireless connections, or a combination of wired and wireless connections.

Client device 205 includes one or more devices capable of receiving, generating, storing, processing, and/or providing information (e.g., information for natural language processing, as described herein). For example, client device 205 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

Server device 210 includes one or more devices capable of receiving, storing, processing, and/or providing information associated with respondents (e.g., performance information, test information, etc.). For example, server device 210 may include a server, a group of servers, or a similar device. In some implementations, server device 210 may be hosted in cloud computing environment 220, as is described in more detail below.

Incident processing system 215 includes one or more devices capable of receiving, generating, storing, processing, and/or providing information (e.g., information for natural language processing, as described herein). For example, incident processing system 215 may include a server, a group of servers, or a similar device.

In some implementations, as shown, incident processing system 215 may be hosted in cloud computing environment 220. Notably, while implementations described herein describe incident processing system 215 as being hosted in cloud computing environment 220, in some implementations, incident processing system 215 may not be cloud-based or may be partially cloud-based.

Cloud computing environment 220 includes an environment that hosts incident processing system 215. Cloud computing environment 220 may provide computation, software, data access, storage, etc. services that do not require end-user (e.g., user device 205) knowledge of a physical location and configuration of system(s) and/or device(s) that hosts incident processing system 215. As shown, cloud computing environment 220 includes a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host incident processing system 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by user device 205. Application 222-1 may eliminate a need to install and execute the software applications on user device 205. For example, application 222-1 may include software associated with incident processing system 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., user device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
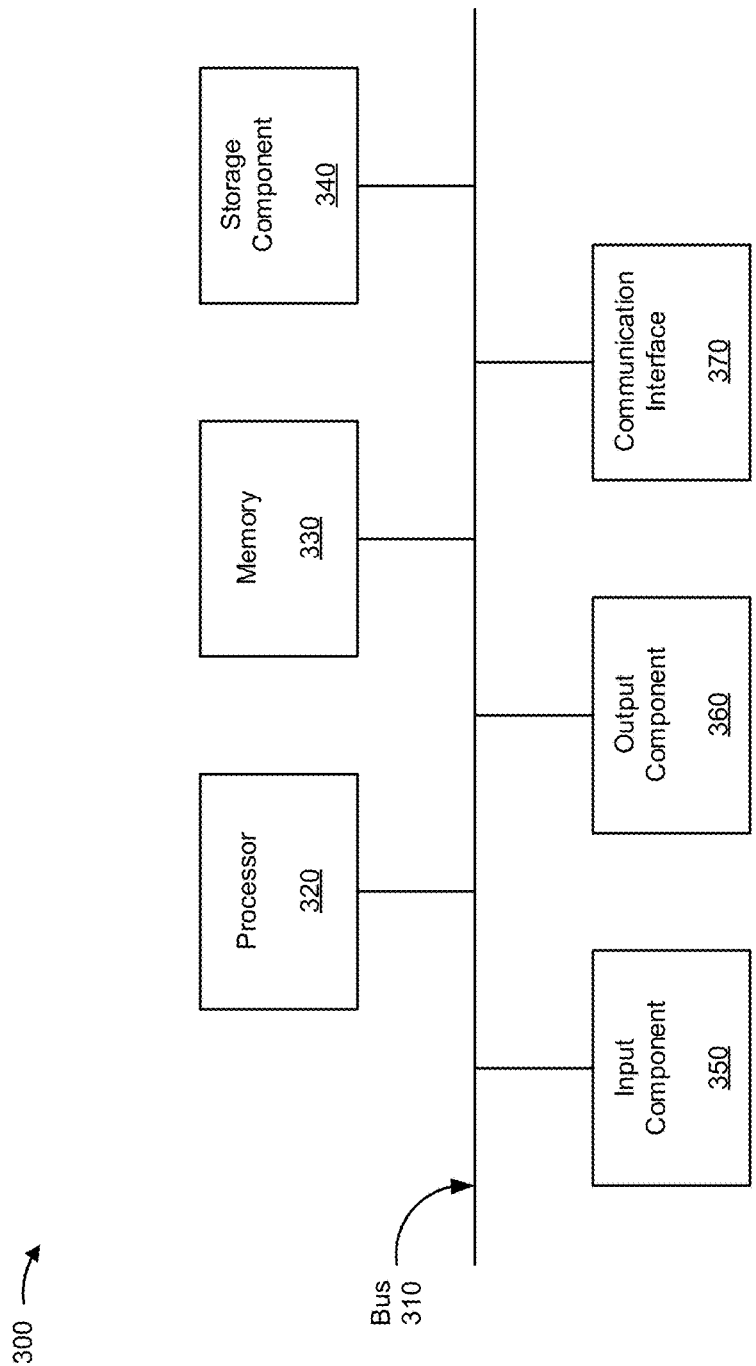
FIG. 3 is a diagram of example components of one or more devices of FIG. 2.

FIG. 3 is a diagram of example components of a device 300. Device 300 may correspond to client device 205, server device 210, incident processing system 215, and/or computing resource 222. In some implementations, client device 205, server device 210, incident processing system 215, and/or computing resource 222 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing components. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for training a model to identify patterns of occurrence and/or predicted samples for a set of input samples based on a set of historical samples. In some implementations, one or more process blocks of FIG. 4 may be performed by incident processing system 215. In some implementations, one or more process blocks of FIG. 4 may be performed by another device or a group of devices separate from or including incident processing system 215, such as client device 205 or server device 210.

As shown in FIG. 4, process 400 may include receiving a set of historical samples and incident information associated with the set of historical samples (block 410). For example, incident processing system 215 may receive a set of historical samples and incident information associated with the set of historical samples. In some implementations, incident processing system 215 may receive the set of historical samples from client device 205 (e.g., based on users inputting historical samples to client device 205, based on client device 205 storing the historical samples for later processing, based on obtaining the historical samples from a memory, etc.).

In some implementations, historical samples may be associated with one or more events relating to a monitored system. For example, historical samples may be related to abnormal events or behavior, associated with an application or system, based on which users have generated service tickets. The historical samples may include or be generated based on the service tickets. In some implementations, historical samples associated with a first monitored system may be used predict abnormal behavior or predicted samples associated with a second monitored system. For example, the historical samples may be used to train a model with regard to the first monitored system, and the model may be used to identify predicted samples associated with a second, different monitored system. This may permit preventative actions to be taken for the second monitored system without the necessity of training a model specifically for the second monitored system.

In some implementations, historical samples may be associated with textual descriptions of corresponding events or behavior (e.g., generated by a user of an application or system). In some implementations, historical samples may be associated with incident information. For example, the incident information may identify a time at which the historical sample was received or generated. Additionally, or alternatively, the incident information may identify a priority level related to the historical sample. In this case, the priority level may be user-generated or automatically generated (e.g., based on a particular device associated with the historical samples, based on descriptions of the historical samples, etc.). Additionally, or alternatively, the incident information may identify a device or location related to the historical sample. Additionally, or alternatively, the incident information may identify a sample identifier related to the historical sample.

As further shown in FIG. 4, process 400 may include identifying clusters of the set of historical samples based on semantic similarity of the historical samples (block 420). For example, incident processing system 215 may identify clusters of the historical samples. In some implementations, a cluster of historical samples may include historical samples that are semantically similar to each other. Additionally, or alternatively, a cluster of historical samples may include historical samples that occurred within a particular time period. Incident processing system 215 may determine the semantic similarity based on a technique for determining semantic similarity, such as defining a topological similarity between terms and concepts of the historical samples, or another such technique.

For example, incident processing system 215 may identify groups of historical samples that are associated with some degree of semantic similarity, and that were received within a particular time period (e.g., one hour, one day, one week, etc.), and may generate the clusters based on the identified groups of historical samples. In some implementations, a cluster of multiple, different similar samples may be associated with a particular event. For example, a particular event may cause multiple, different similar samples to be generated when the particular event affects multiple, different client devices or users.

In some implementations, incident processing system 215 may identify the clusters of historical samples based on a data structure, such as a graph data structure. For example, incident processing system 215 may generate a graph data structure that identifies samples (nodes of the graph) and semantic relationships between the samples (edges of the graph). In some implementations, the graph may include a weighted graph. For example, the graph may include weights of edges identifying semantic similarity of nodes that are connected by the edges. In some implementations, a link with a higher weight between two nodes may indicate that the two nodes are more semantically similar than two nodes connected by a link with a lower weight.

In some implementations, incident processing system 215 may identify multiple, different clusters. For example, a set of historical samples may include multiple clusters of semantically similar historical samples corresponding to one or more events, and incident processing system 215 may identify the multiple clusters, as described in connection with clusters C0, C1, and C2 of FIGS. 1A-1D, above. In some implementations, as described in more detail elsewhere herein, incident processing system 215 may identify patterns of occurrence and/or predicted samples based on relationships between the multiple, different clusters.

In some implementations, incident processing system 215 may generate a normalized representation of the set of historical samples based on the clusters. For example, incident processing system 215 may assign a cluster identifier to each cluster. In this case, incident processing system 215 may store information associating each sample of a cluster with the cluster identifier and with a timestamp identifying the time at which each sample was received. In some implementations, when a historical sample is associated with multiple, different clusters (e.g., based on semantic similarity to each of the multiple, different clusters, etc.), incident processing system 215 may assign, to the historical sample, cluster identifiers corresponding to each of the clusters associated with the historical sample. In this way, incident processing system 215 generates a normalized representation of the set of historical samples based on the graph data structure, which may improve accuracy of computations relating to the set of historical samples, and which may conserve processor and programming resources that would otherwise be used to process an un-normalized data set.

As further shown in FIG. 4, process 400 may include identifying patterns of occurrence of the clusters based on the incident information (block 430). For example, incident processing system 215 may identify one or more patterns of occurrence of the clusters. In some implementations, a pattern of occurrence may identify a sequence of two or more clusters. For example, when a sample associated with a first cluster has been received before a sample associated with a second cluster on a number of occasions that satisfies a threshold, incident processing system 215 may identify a pattern of occurrence that identifies the first cluster followed by the second cluster. In some implementations, a pattern of occurrence may not include exactly the same samples on each occurrence that are not exactly the same. For example, in the above example, any sample of the first cluster followed by any sample of the second cluster may lead to identification of the pattern of occurrence of the first cluster followed by the second cluster.

In some implementations, a pattern of occurrence may permit identification of predicted samples based on one or more input samples. For example, where one or more input samples are semantically similar to one or more clusters of historical samples, and the one or more clusters precede a particular cluster in a pattern of occurrence, incident processing system 215 may identify a sample, of the particular cluster, as a predicted sample. Thus, incident processing system 215 predicts samples to be received based on a set of historical samples and input samples, which permits preventative action to be taken with regard to predicted samples, thus improving performance of the monitored system. Notably, implementations described herein can be performed with regard to large quantities of historic samples and input samples (e.g., thousands of samples, millions of samples, etc.), which is difficult or impossible for a human manager.

In some implementations, incident processing system 215 may identify the patterns of occurrence based on a graph. For example, incident processing system 215 may generate a graph data structure with samples as nodes of the graph data structure and edges that identify semantic similarity of pairs of nodes. In some implementations, incident processing system 215 may assign edges based on a threshold. For example, the threshold may identify a threshold degree of semantic similarity such that incident processing system 215 generates an edge between two nodes when the threshold is satisfied, and incident processing system 215 does not generate an edge between two nodes when the threshold is not satisfied.

Continuing the above example, incident processing system 215 may identify maximal clusters of the nodes as clusters of historical samples. For example, a maximal cluster may be a cluster that is not included in any other cluster of the graph. In this case, each maximal cluster may correspond to an event that caused multiple service tickets (corresponding to nodes of the maximal cluster). In some implementations, incident processing system 215 may identify maximal clusters based on an algorithm, such as the Bron-Kerbosch algorithm, which is an algorithm for finding maximal clusters in an undirected graph. The Bron-Kerbosch algorithm lists all subsets of vertices having a first property that each pair of vertices in one of the listed subsets is connected by an edge, and a second property that no listed subset can have any additional vertices added to the listed subset while preserving its complete connectivity. By using maximal clusters to identify the clusters of historical samples, incident processing system 215 reduces a likelihood of errors caused by identifying multiple, different clusters that are partially or completely overlapped. For example, identifying overlapping clusters of samples, or a first cluster that is included in a second cluster, may reduce accuracy of identification of underlying events associated with the clusters, or may lead to duplicate clusters, improper determination of predicted events, or the like.

In some implementations, incident processing system 215 may identify patterns of occurrence based on eliminating repeated samples, corresponding to repeated service tickets. For example, a repeated sample may be associated with an underlying event that may cause incidents with regard to multiple devices, thus generating multiple service tickets. Incident processing system 215 may identify two or more samples occurring within a threshold amount of time of each other that are semantically similar or identical, and may reduce the two or more consecutive samples to a single representative sample or a single cluster. For example, referring back to FIG. 1A, incidents INC102 and INC103 may be eliminated or combined following INC101. In this case, incident processing system 215 may assign a timestamp to the representative sample based on an average time associated with the samples, based on an earliest time associated with the samples, based on a latest time associated with the samples, or the like. In this way, incident processing system 215 conserves processor resources that would otherwise be used to process multiple repeated samples, and reduces a likelihood of errors based on processing repeated samples (e.g., false positives based on patterns of occurrence, etc.).

In some implementations, incident processing system 215 may identify patterns of occurrence based on eliminating repeated clusters or cluster identifiers, corresponding to repeated samples, from a set of input samples. For example, incident processing system 215 may identify a set of repeated samples that are each semantically similar to a particular cluster, and may assign a particular identifier (e.g., a particular cluster identifier) associated with the particular cluster to each sample of the set of repeated samples. Incident processing system 215 may replace the set of repeated samples and/or the set of cluster identifiers with a single sample or identifier corresponding to the particular cluster.

In some implementations, incident processing system 215 may identify patterns of occurrence based on a ratio of shared clusters to non-shared clusters of a pattern of occurrence. For example, assume that incident processing system 215 identifies a first set of five clusters, and a second set of five clusters that occurs in the same order as the first set of five clusters. Incident processing system 215 may identify the first set and the second set as candidates for a pattern of occurrence. In such a case, incident processing system 215 may determine a quantity of shared clusters associated with the pattern of occurrence (e.g., a quantity of particular clusters that are included in the first set of five clusters and the second set of five clusters), may determine a quantity of non-shared clusters (e.g., a quantity of particular clusters that are included in only one of the first set of five clusters and the second set of five clusters), and may determine a ratio of the quantity of shared clusters and the quantity of non-shared clusters. When the ratio satisfies a particular threshold, incident processing system 215 may identify the pattern of occurrence as valid. When the ratio does not satisfy the particular threshold, incident processing system 215 may discard the pattern of occurrence. In some implementations, this process may be referred to as fuzzy matching.

In some implementations, incident processing system 215 may identify patterns of occurrence based on temporal sequence matching between two sets of clusters. To perform temporal sequence matching, incident processing system 215 may remove clusters (e.g., cluster identifiers) that are not included in both of the sets of clusters so that only shared clusters remain in the sets of clusters. Incident processing system 215 may determine a rank correlation coefficient that identifies a correlation value between the sets of clusters using a statistical method (e.g., Spearman's rho method, Kendall's tau method, etc.). Incident processing system 215 may determine a temporal sequence matching coefficient (e.g., a value between 0 and 1 based on user input, based on a default value, based on a machine learning algorithm, etc.) for comparison to the rank correlation coefficient. In this case, when the rank correlation coefficient satisfies a threshold with regard to the temporal sequence matching coefficient (e.g., when the rank correlation coefficient is greater than or equal to one minus the temporal sequence matching coefficient), incident processing system 215 may identify the sets of clusters as matching based on temporal sequence. When the rank correlation coefficient does not satisfy the threshold, incident processing system 215 may identify the sets of clusters as not matching.

In some implementations, incident processing system 215 may identify patterns of occurrence based on comparing time windows associated with two or more sets of clusters. For example, for two sets of clusters, incident processing system 215 may determine a time window associated with each set of clusters (e.g., based on respective earliest times associated with samples of each set of clusters and latest times associated with samples of each set of clusters). In this case, incident processing system 215 may determine whether the time windows overlap, and whether the time windows are similar in length (e.g., whether a difference between the time windows satisfies a particular threshold). When the time windows do not overlap, and when the difference between the time windows satisfies the particular threshold (e.g., is less than a threshold difference), incident processing system 215 may identify a pattern of occurrence based on the two sets of clusters.

In some implementations, incident processing system 215 may identify patterns of occurrence based on a combination of fuzzy matching, temporal sequence matching, and/or time windows associated with a pair of cluster sets. For example, when the pair of cluster sets is matched based on fuzzy matching, temporal sequence matching, and time windows, incident processing system 215 may identify a pattern of occurrence based on the pair of cluster sets. In this case, the pattern of occurrence may be identified as a recurring pattern (e.g., a pattern that always occurs in a particular order).

As another example, when the pair of cluster sets is matched based on fuzzy matching and time windows, but not based on temporal sequence matching, incident processing system 215 may identify a clustering pattern of events (e.g., a pattern that occurs in a particular time window, but may or may not be associated with a particular order or temporal sequence) based on the pair of cluster sets.

In some implementations, incident processing system 215 may determine whether an identified pattern of occurrence is likely to be caused by random co-occurrence, or by one or more underlying events. For example, incident processing system 215 may calculate a probability of random occurrence of a pattern of a particular length (e.g., a particular quantity of clusters included in the pattern). In this case, incident processing system 215 may compare an expected quantity of random occurrences of patterns of the particular length, to an observed quantity of occurrences of patterns of the particular length. When the observed quantity exceeds the expected quantity by a particular threshold (e.g., a user defined threshold, a threshold based on a model, a default value of a threshold, etc.), incident processing system 215 may determine that observed occurrences of the pattern are valid (i.e., not caused by random co-occurrence of clusters).

In some implementations, incident processing system 215 may determine a confidence score corresponding to a pattern of occurrence. For example, the confidence score for a pattern of a particular length may be based on a ratio of an observed quantity of patterns of the particular length and an expected quantity of random occurrences of patterns of the particular length. In this way, incident processing system 215 permits ranking of the patterns of occurrence based on the confidence score, and enables filtering of patterns of occurrence based on the confidence score not satisfying a threshold, which conserves processor resources that would otherwise be used to process larger quantities of patterns.

As further shown in FIG. 4, process 400 may include training a model to identify patterns of occurrence and/or predicted samples based on a set of input samples and the clusters of historical samples (block 440). For example, incident processing system 215 may train a model based on the clusters of historical samples (i.e., the clusters of semantically similar historical samples). In some implementations, the model may receive, as input, one or more input samples, and may output information identifying patterns of occurrence associated with the one or more input samples and/or predicted samples that are predicted to occur based on the one or more input samples.

In some implementations, incident processing system 215 may train the model to identify the patterns of occurrence based on the clusters of historical samples. For example, the model may receive input samples, and may match each input sample to one or more corresponding clusters of historical samples based on semantic similarity of each input sample to the corresponding cluster of historical samples. The model may then identify a pattern of occurrence associated with the corresponding clusters of historical samples, and may identify one or more predicted samples based on the pattern of occurrence.

In some implementations, incident processing system 215 may train the model based on a machine learning algorithm, a neural network process, an artificial intelligence process, or the like. For example, incident processing system 215 may train the model based on a training set of clusters of historical samples and known predicted samples associated with the clusters of historical samples. In this case, a known predicted sample may be a sample that was received in conjunction with a corresponding cluster of historical samples. Incident processing system 215 may train the model by identifying relationships between the clusters of historical samples and the known predicted samples (e.g., probabilistic relationships, temporal relationships, etc.).

In some implementations, incident processing system 215 may update the model based on a machine learning algorithm, a neural network, an artificial intelligence process, or the like. For example, incident processing system 215 may use the model to identify predicted samples associated with a set of input samples. Incident processing system 215 may receive or determine information identifying observed samples that are received after the set of input samples. In this case, incident processing system 215 may update the model based on comparing the observed samples to the predicted samples. As an example, incident processing system 215 may adjust the relationships between the set of historical samples and the predicted samples identified by the model. As another example, incident processing system 215 may add the input samples and the observed samples to the set of historical samples used by the model. As still another example, incident processing system 215 may update coefficients or values used by one or more operations described with regard to blocks 420-440.

In this way, incident processing system 215 updates the model based on observed samples, which improves accuracy of the model without requiring human intervention to improve the accuracy of the model. Further, by improving accuracy of the model, processor and organizational resources are conserved that would otherwise be used to manually adjust the model.

As further shown in FIG. 4, process 400 may include storing or providing information identifying the clusters of historical samples, the patterns of occurrence, and/or the model (block 450). For example, incident processing system 215 may store or provide information identifying the clusters of historical samples, the patterns of occurrence, and/or the model. In some implementations, incident processing system 215 may store the information identifying the clusters of historical samples, the patterns of occurrence, and/or the model locally. In this way, incident processing system 215 conserves resources of client device 205 that would otherwise be used to run the model. In some implementations, the clusters of historical samples and/or the patterns of occurrence may be stored by another device (e.g., client device 205, one or more devices of a cloud computing environment, etc.). In this way, storage and processor resources of incident processing system 215 are conserved.

In some implementations, incident processing system 215 may provide information regarding the set of historical samples and/or the model to a user. For example, incident processing system 215 may provide information identifying the clusters and/or the patterns of occurrence. In some implementations, incident processing system 215 may receive user input regarding the model, and may update the model based on the user input. For example, the user input may identify additional patterns, additional historical samples, and/or clusters of historical samples other than those identified by incident processing system 215.

In some implementations, incident processing system 215 may update the model based on the user input. For example, incident processing system 215 may update one or more coefficients for identifying patterns, may add the historical samples to the set of historical samples used by the model, may add the additional patterns to a set of patterns used by the model, or the like. In this way, incident processing system 215 updates the model based on user input, thereby improving accuracy of the model, reducing false positives in predicted samples, and improving remediation of input samples and predicted samples.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for identifying patterns of occurrence and/or predicted samples for a set of input samples based on a model. In some implementations, one or more process blocks of FIG. 5 may be performed by incident processing system 215. In some implementations, one or more process blocks of FIG. 5 may be performed by another device or a group of devices separate from or including incident processing system 215, such as client device 205 or server device 210.

As shown in FIG. 5, process 500 may include receiving a set of input samples (block 510). For example, incident processing system 215 may receive a set of input samples (e.g., from client device 205). In some implementations, incident processing system 215 may receive the set of input samples based on the set of input samples being received by client device 205 as input. For example, a user may generate the set of input samples as service tickets in natural language. Incident processing system 215 may receive service tickets as input samples to identify patterns of occurrence and/or predicted samples associated with the input samples based on the model generated in connection with FIG. 4.

In some implementations, the set of input samples may be associated with incident information. For example, the incident information may identify a time at which the input sample was received or generated. Additionally, or alternatively, the incident information may identify a priority level related to the input sample. Additionally, or alternatively, the incident information may identify a device or location related to the input sample. Additionally, or alternatively, the incident information may identify a sample identifier related to the input sample. The incident information may permit more accurate identification of similar clusters, predicted priority levels, or the like.

As further shown in FIG. 5, process 500 may include identifying one or more clusters of historical samples that are similar to the set of input samples (block 520). For example, incident processing system 215 may identify one or more clusters of historical samples that are similar to the set of input samples. In some implementations, incident processing system 215 may identify a cluster of historical samples, corresponding to a particular input sample, based on semantic similarity of the input sample to the cluster of historical samples. For example, the cluster of historical samples may be associated with a particular semantic pattern or sequence, and incident processing system 215 may identify the particular semantic pattern or sequence in the particular input sample. In this way, incident processing system 215 allows semantic identification of similarities between historical samples and input samples, thus removing a subjective human input from the process and improving speed and efficiency of identification of the similarities.

In some implementations, an input sample may be semantically similar to multiple, different clusters of historical samples. In such a case, incident processing system 215 may select the cluster of historical samples that is most semantically similar to the input sample. In this way, incident processing system 215 saves processor resources as compared to identifying the cluster of historical samples based on a more complex procedure. Additionally, or alternatively, incident processing system 215 may select the cluster of historical samples based on similarity of incident information associated with the input sample and the clusters of historical samples, or based on a combination of semantic similarity, incident information, and/or other information associated with the input sample, which may improve accuracy of identification of a similar cluster.

In some implementations, incident processing system 215 may identify multiple, different clusters as semantically similar to the input sample. For example, incident processing system 215 may identify patterns and/or predicted samples with regard to each of the multiple, different clusters. In this case, incident processing system 215 may assign relative likelihoods of occurrence to the predicted samples based on semantic similarity of the input sample to each of the multiple, different clusters. For example, incident processing system 215 may generate a probability tree that identifies each of the predicted samples, and may determine the likelihoods of occurrence based on the probability tree. In this way, incident processing system 215 permits identification of predicted samples with regard to input samples that are similar to multiple clusters, thereby improving accuracy and usefulness of the predicted samples.

In some implementations, incident processing system 215 may select the one or more clusters of historical samples based on a model. For example, incident processing system 215 may select the one or more clusters of historical samples based on a model that is generated as described in connection with FIG. 4, above. In some implementations, the model may receive, as input, the set of input samples. The model may output information identifying the clusters of historical samples corresponding to the input samples. For example, the model may use multiple, different factors to identify the clusters of historical samples, such as similarity of incident information associated with the input samples and the clusters of historical samples, semantic similarity of the input samples and the clusters of historical samples, or the like. In some implementations, the model may output confidence scores indicating a confidence level of the model with regard to the outputs.

In some implementations, incident processing system 215 may normalize the set of input samples based on the one or more clusters of historical samples. For example, incident processing system 215 may assign, to each input sample, one or more cluster identifiers associated with the one or more clusters of historical samples to which each input sample is semantically similar. In some implementations, incident processing system 215 may associate each input sample with a time at which each input sample was received. In this case, the time may be used to determine patterns of occurrence based on the one or more clusters corresponding to each input sample.

As further shown in FIG. 5, process 500 may include identify a pattern of occurrence based on the one or more clusters and the set of input samples (block 530). For example, incident processing system 215 may identify a pattern of occurrence based on the one or more clusters of historical samples and the set of input samples. In some implementations, a pattern of occurrence may identify a sequence of clusters of historical samples, and may identify an order and/or timing in which samples have previously been received. In some implementations, incident processing system 215 may identify a particular pattern of occurrence based on the particular pattern of occurrence being associated with the one or more clusters corresponding to the set of input samples.

For example, referring to FIGS. 1A-1D, where incidents 100 and 101 (identified by reference number 136 and 138) have been received as input samples, and where clusters C1 and C0 (identified by reference numbers 124 and 128) have been identified as similar to the input samples, pattern P1 of clusters C1-C0-C2 (identified by reference number 132) may be identified as a pattern of occurrence.

In some implementations, a pattern of occurrence may permit prediction of predicted samples that may be received based on the clusters of historical samples and the input samples. Continuing the above example, based on C1 and C0 being identified as similar to the received input samples, and based on C1-C0-C2 being identified as a pattern of occurrence, a predicted sample may be associated with cluster C2 (e.g., a remaining cluster of the pattern of occurrence), and a predicted event of "Travel Website is down" (shown by reference number 152) may thereby be predicted.

To identify the patterns of occurrence, incident processing system 215 may identify historical sets of clusters that are semantically similar to one or more input samples of the set of input samples. When incident processing system 215 determines that the set of input samples matches each cluster, of a historical set of clusters, incident processing system 215 may invalidate the historical set of clusters as a potential match, because each input sample that the historical set of clusters could be used to predict is included in the set of input samples. When incident processing system 215 determines that a set of historical clusters contains the set of input samples as a proper prefix of the set of historical clusters, incident processing system 215 may select the observed pattern associated with the set of historical clusters for prediction of predicted sample(s). A proper prefix of a set includes a sequential subset of the set, beginning with a first value of the set. For example, the string "ban" is a proper prefix of the string "banana," and the strings "ana" and "bnn" are not proper prefixes of the string "banana."

In some implementations, incident processing system 215 may identify a pattern of occurrence based on a model, such as a model described in connection with FIG. 4, above. In this case, the model may receive, as input, input samples and/or information identifying corresponding clusters of historical samples. The model may output information identifying the pattern of occurrence corresponding to the input samples. For example, the model may select a pattern of occurrence from multiple, different patterns of occurrence corresponding to known clusters of historical samples.

In some implementations, the model may take into account multiple different factors to select patterns of occurrence. For example, the model may take into account a similarity of incident information associated with samples of the patterns of occurrence. Additionally, or alternatively, the model may take into account respective probabilities of occurrence of different patterns of occurrence. Additionally, or alternatively, the model may take into account user input to assign weights or priorities to particular patterns of occurrence. Additionally, or alternatively, the model may take into account a similarity of the input samples to different clusters of historical samples corresponding to different patterns of occurrence. In this case, the model may identify patterns as outputs, and may include confidence scores that indicate how confident the model is with each pattern identified. Additionally, or alternatively, the model may identify only patterns that have confidence scores that satisfy a threshold.

As further shown in FIG. 5, process 500 may include identifying one or more predicted samples, based on a model, that are predicted to be received based on the pattern of occurrence (block 540). For example, incident processing system 215 may identify one or more predicted samples that are predicted to be received or predicted to occur based on the pattern of occurrence identified with regard to block 530, above. In some implementations, incident processing system 215 may identify the one or more predicted samples based on a model, such as a model that is trained based on the operations described in connection with FIG. 4, above. By using a model to identify the predicted samples, incident processing system 215 permits identification of predicted samples based on an objective computational process, rather than human intuition. This allows training and updating of the model based on comparing observed events and predicted events, which improves accuracy of the model and enables proactive action to be taken to prevent or reduce impact of the predicted events.

In some implementations, incident processing system 215 may identify multiple, different predicted samples for a set of input samples. For example, incident processing system 215 may identify a series of predicted samples that incident processing system 215 is predicted to receive after the set of input samples. As a particular example, incident processing system 215 may identify a nearest subsequent sample, a second-nearest subsequent sample, or the like. Where multiple, different predicted samples are identified, incident processing system 215 may identify probabilities of occurrence associated with each predicted sample, and may provide information or perform an action based only on those predicted samples associated with a probability of occurrence that satisfies a particular threshold. This may reduce a quantity of predicted samples for which to provide information or perform an action, thus reducing processor and storage usage, and enabling users or workers to prioritize remediation of most-likely predicted samples.

To determine probabilities of occurrence, incident processing system 215 may identify a quantity of predicted samples associated with the set of input samples, may determine relative quantities of each predicted sample, of the predicted samples, and may determine the relative probability based on the quantity of predicted samples and the relative quantities of each predicted sample. For example, assume that incident processing system 215 identifies a total of ten predicted samples, and assume that four of the ten predicted samples are a particular sample (e.g., are identical or substantially identical, or are associated with a particular cluster). In such a case, incident processing system 215 may determine a relative probability of occurrence, of the particular sample relative to other samples of the ten predicted samples, of 40% (e.g., $4/10$).

In some implementations, incident processing system 215 may store and/or provide information based on the relative probabilities of occurrence of each predicted sample. For example, incident processing system 215 may select a subset of the predicted samples to be provided to client device 205 based on a threshold probability value (e.g., one or more predicted samples with highest respective probabilities, predicted samples associated with a probability that satisfies a threshold, etc.). In some implementations, incident processing system 215 may provide the relative probabilities to a user or worker associated with the input tickets, and/or may provide a ranked list of the predicted samples based on the relative probabilities.

In some implementations, incident processing system 215 may determine a predicted priority level associated with a particular predicted sample. For example, incident processing system 215 may determine the predicted priority level based on particular priority levels associated with a cluster corresponding to the particular predicted sample. In this case, incident processing system 215 may determine the predicted priority level based on an average priority level associated with historical samples of the cluster, a highest priority level associated with the historical samples of the cluster, or the like.

As another example, incident processing system 215 may determine the predicted priority level based on priority levels associated with the input samples. In this case, when each input sample is associated with a particular priority level (e.g., a high priority level, a low priority level, etc.), incident processing system 215 may set the predicted priority level as the particular priority level. By determining a predicted priority level, incident processing system 215 permits selective prioritization of the particular predicted sample by a worker, thus improving distribution of worker resources and improving uptime and/or performance of the monitored system.

As further shown in FIG. 5, process 500 may include performing an action based on the one or more clusters, the pattern of occurrence, and/or the one or more predicted samples (block 550). For example, incident processing system 215 may perform an action based on the one or more clusters, the pattern, and/or the one or more predicted samples. In some implementations, incident processing system 215 may provide information identifying the one or more clusters (e.g., representative samples corresponding to the one or more clusters), the pattern associated with the input samples (e.g., the pattern that is identified based on the input samples), and/or the one or more predicted samples. For example, incident processing system 215 may generate and provide a report, such as the report described in connection with FIG. 1D, above.

In some implementations, incident processing system 215 may perform one or more actions based on the one or more predicted samples. For example, incident processing system 215 may reconfigure a device to mitigate or prevent an event associated with a predicted sample. Additionally, or alternatively, incident processing system 215 may provide a notification message to a worker to address the set of input samples and/or the one or more predicted samples. Additionally, or alternatively, incident processing system 215 may automatically close service tickets associated with the one or more predicted samples. In this case, incident processing system 215 may close the tickets based on a worker having already been dispatched to process the input samples. Additionally, or alternatively, the incident processing system may order a part for a device associated with the one or more predicted samples. Additionally, or alternatively, the incident processing system may generate a work order based on the predicted samples. Additionally, or alternatively, the incident processing system may reboot a device associated with an incident relating to the one or more predicted samples. Additionally, or alternatively, the incident processing system may perform troubleshooting on a device based on the one or more predicted samples.

In some implementations, incident processing system 215 may identify a worker to be assigned to the one or more input samples and/or the one or more predicted samples. For example, incident processing system 215 may identify a worker who may have previously been assigned to samples of the one or more clusters associated with the pattern, and who may be more familiar with the events associated with the input samples and/or the one or more predicted samples, and may therefore more efficiently address the events, than a worker unfamiliar with the one or more clusters. In this way, performance of the monitored system is improved, efficiency of allocation of workers is improved, and a process that was previously performed subjectively by a human (e.g., identification of predicted events or tickets and assignment of an appropriately experienced worker) is performed automatically based on a well-defined process.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may receive historical service tickets (i.e., historical incident data) and extract patterns identifying clusters of historical service tickets that may be associated with a particular underlying event or incident. Further, implementations described herein may match input tickets (e.g., newly received tickets) with the clusters of historical service tickets. This may permit identification of predicted service tickets based on the clusters and the input tickets, and may also permit determination of information associated with predicted service tickets, such as time of arrival, priority level, and/or level of confidence of occurrence of the predicted service tickets.

In this way, prediction of incidents may enable immediate closure of the predicted incidents (when the predicted incidents are duplicates) or may enable preventative measures to be taken with regard to the incidents (e.g., automatically), thereby conserving computational resources that would otherwise be used to process or address predicted incidents independently of the input service ticket. Further, an objective computational process may be created to automate a previously subjective human-based determination (e.g., identification of predicted incidents in light of historical incident information), which saves time, improves efficiency and accuracy of the determination, and is more easily scalable to large quantities of service tickets. Still further, identification of underlying system dynamics is enabled (e.g., identification of events causing service tickets, relationships between events causing service tickets, etc.), which allows for reconfiguration of the system to improve performance, conserve processor resources, and reduce system downtime.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a plurality of first samples of textual content;
   identify a plurality of clusters of the plurality of the first samples,
      a cluster, of the plurality of clusters, to be identified based on semantic similarity of samples included in the cluster;
   identify a pattern of occurrence based on the plurality of clusters,
      the pattern of occurrence to identify two or more clusters, of the plurality of clusters, based on an order in which samples associated with the two or more clusters were generated or received;
   receive one or more second samples of textual content;
   determine that the one or more second samples are semantically similar to one or more corresponding clusters associated with the pattern of occurrence;
   identify a predicted sample based on the pattern of occurrence and the one or more corresponding clusters; and
   perform an action based on identifying the predicted sample,
      the action including reconfiguring another device to mitigate or prevent an event associated with the predicted sample,
         reconfiguration of the other device including a modification of at least one of:
            a performance of the other device,
            a utilization of processor resources, or
            downtime of the other device.

2. The device of claim 1, where the one or more processors are further to:
   identify a first set of clusters and a second set of clusters of the plurality of clusters,
      the first set of clusters and the second set of clusters including at least one shared cluster, of the plurality of clusters, and at least one non-shared cluster of the plurality of clusters; and
   determine a ratio of shared clusters to non-shared clusters of the first set of clusters and the second set of clusters; and
   where the one or more processors, when identifying the pattern of occurrence, are to:
      identify the pattern of occurrence based on the ratio of shared clusters to non-shared clusters satisfying a threshold.

3. The device of claim 1, where the one or more processors are further to:
  identify a first set of clusters and a second set of clusters of the plurality of clusters,
    the first set of clusters and the second set of clusters including at least one shared cluster, of the plurality of clusters, and at least one non-shared cluster of the plurality of clusters; and
  determine a rank correlation coefficient of the first set of clusters and the second set of clusters; and
  where the one or more processors, when identifying the pattern of occurrence, are to:
    identify the pattern of occurrence based on the rank correlation coefficient satisfying a threshold.

4. The device of claim 3, where the one or more processors are further to:
  identify a sequence of clusters, of the first set of clusters or the second set of clusters, based on each cluster of the sequence of clusters being associated with a particular identifier; and
  replace the sequence of clusters with a single cluster associated with the particular identifier.

5. The device of claim 1, where the one or more processors are further to:
  identify a first set of clusters and a second set of clusters of the plurality of clusters,
    the first set of clusters and the second set of clusters including at least one shared cluster, of the plurality of clusters, and at least one non-shared cluster of the plurality of clusters,
    the first set of clusters being associated with a first time window based on first times at which samples associated with the first set of clusters were received, and
    the second set of clusters being associated with a second time window based on second times at which samples associated with the first set of clusters were received; and
  determine a difference between the first time window and the second time window; and
  where the one or more processors, when identifying the pattern of occurrence, are to:
    identify the pattern of occurrence based on the difference satisfying a threshold.

6. The device of claim 1, where the one or more processors are further to:
  identify a remaining cluster, of the two or more clusters associated with the pattern of occurrence, other than the one or more corresponding clusters; and
  where the one or more processors, when identifying the predicted sample, are to:
    select, from a group of the first samples associated with the remaining cluster, the predicted sample.

7. The device of claim 1, where the pattern of occurrence is a particular pattern of occurrence of a plurality of patterns of occurrence; and
  where the one or more processors, when identifying the particular pattern of occurrence, are to:
    identify the particular pattern of occurrence based on the one or more corresponding clusters being a proper prefix of the two or more clusters of the particular pattern of occurrence.

8. A method, comprising:
  receiving, by a device, a plurality of first samples of textual content;
  identifying, by the device, a plurality of clusters of the plurality of the first samples,
    each cluster, of the plurality of clusters, to be identified based on semantic similarity of samples included in each cluster;
  identifying, by the device, a pattern of occurrence based on the plurality of clusters,
    the pattern of occurrence to identify two or more clusters, of the plurality of clusters, based on an order in which samples associated with the two or more clusters were generated or received;
  receiving, by the device, one or more second samples of textual content;
  determining, by the device, that the one or more second samples are semantically similar to one or more corresponding clusters associated with the pattern of occurrence;
  identifying, by the device and based on the pattern of occurrence and the one or more corresponding clusters, a predicted sample; and
  performing, by the device, an action based on identifying the predicted sample,
    the action including reconfiguring another device to mitigate or prevent an event associated with the predicted sample,
      reconfiguration of the other device including a modification of at least one of:
        a performance of the other device,
        a utilization of processor resources, or
        downtime of the other device.

9. The method of claim 8, where performing the action further comprises:
  identifying a worker associated with one or more samples of the two or more clusters; and
  assigning the worker to the predicted sample.

10. The method of claim 8, further comprising:
  receiving information identifying a plurality of priority levels associated with the plurality of the first samples;
  determining a predicted priority level associated with the predicted sample based on the information identifying the plurality of priority levels; and
  providing information identifying the predicted priority level.

11. The method of claim 10, where determining the predicted priority level comprises:
  determining the predicted priority level based on particular priority levels of the plurality of priority levels,
    the particular priority levels being associated with samples, of the plurality of the first samples, corresponding to the two or more clusters.

12. The method of claim 8, where the predicted sample is a particular predicted sample of a plurality of predicted samples; and
  where the method further comprises:
    identifying respective probabilities of occurrence associated with the plurality of predicted samples based on the pattern of occurrence; and
  where identifying the particular predicted sample comprises:
    selecting the particular predicted sample based on a particular probability of occurrence, of the respective probabilities of occurrence, associated with the particular predicted sample.

13. The method of claim 8, where identifying the predicted sample comprises:
  identifying a plurality of predicted samples including the predicted sample; and
  where the method further comprises:

identifying an order of occurrence associated with the plurality of predicted samples; and
providing information identifying the plurality of predicted samples and the order.

14. The method of claim 8, further comprising:
identifying a remaining cluster, of the two or more clusters associated with the pattern of occurrence, other than the one or more corresponding clusters; and
where identifying the predicted sample comprises:
selecting, from a group of the first samples associated with the remaining cluster, the predicted sample.

15. A non-transitory computer-readable medium storing instructions, the instructions comprising:
one or more instructions that, when executed by one or more processors, cause the one or more processors to:
receive a plurality of first samples of textual content;
identify a plurality of clusters of the plurality of the first samples,
each cluster, of the plurality of clusters, to be identified based on semantic similarity of samples included in each cluster;
identify a plurality of patterns of occurrence based on the plurality of clusters,
each pattern of occurrence to identify two or more respective clusters, of the plurality of clusters, based on an order in which samples associated with the two or more respective clusters were generated or received;
receive one or more second samples of textual content;
determine that the one or more second samples are semantically similar to one or more corresponding clusters of a particular pattern of occurrence of the plurality of patterns of occurrence;
identify, based on the particular pattern of occurrence and the one or more corresponding clusters, one or more predicted samples; and
perform an action based on identifying the one or more predicted samples,
the action including reconfiguring another device to mitigate or prevent an event associated with the one or more predicted samples,
reconfiguration of the other device including a modification of at least one of:
a performance of the other device,
a utilization of processor resources, or
downtime of the other device.

16. The non-transitory computer-readable medium of claim 15, where the one or more instructions, that cause the one or more processors to identify the one or more predicted samples, cause the one or more processors to:
identify a plurality of predicted samples based on two or more patterns of occurrence;
where the one or more instructions, when executed by the one or more processors, further cause the one or more processors to:
identify respective probabilities of occurrence associated with the plurality of predicted samples; and
where the one or more instructions, that cause the one or more processors to perform the action, further cause the one or more processors to:
provide information identifying the plurality of predicted samples and the respective probabilities of occurrence.

17. The non-transitory computer-readable medium of claim 15, where the one or more instructions, when executed by the one or more processors, further cause the one or more processors to:
identify one or more remaining clusters, of the two or more respective clusters associated with the particular pattern of occurrence, other than the one or more corresponding clusters; and
where the one or more instructions, that cause the one or more processors to identify the one or more predicted samples, cause the one or more processors to:
identify the one or more predicted samples based on the one or more remaining clusters.

18. The non-transitory computer-readable medium of claim 15, where the one or more instructions, when executed by the one or more processors, further cause the one or more processors to:
train a predictive model based on the plurality of the first samples and the plurality of patterns of occurrence,
the predictive model to receive, as input, the one or more second samples, and
the predictive model to output information identifying the one or more predicted samples; and
where the one or more instructions, that cause the one or more processors to identify the one or more predicted samples, cause the one or more processors to:
identify the one or more predicted samples based on the predictive model.

19. The non-transitory computer-readable medium of claim 18, where the one or more instructions, when executed by the one or more processors, further cause the one or more processors to:
receive information identifying one or more observed samples,
the one or more observed samples being generated or received after the one or more second samples; and
update the predictive model based on the information identifying the one or more observed samples,
the predictive model being updated based on one or more of a machine learning algorithm or a neural network process.

20. The non-transitory computer-readable medium of claim 15, where the one or more instructions, that cause the one or more processors to perform the action based on the one or more predicted samples, further cause the one or more processors to:
automatically mark the one or more predicted samples as resolved based on information associated with the one or more second samples,
the information associated with the one or more second samples indicating that an underlying event associated with the one or more second samples and the one or more predicted samples has been resolved.

* * * * *